Feb. 26, 1946.   O. W. ANDERSEN   2,395,528
TURNTABLE
Filed March 22, 1943

INVENTOR
OSCAR W. ANDERSEN
BY HARRIS, KIECH, FOSTER & HARRIS
*Clarence F. Kiech*
FOR THE FIRM
ATTORNEYS.

Patented Feb. 26, 1946

2,395,528

UNITED STATES PATENT OFFICE 2,395,528

TURNTABLE

Oscar W. Andersen, Los Angeles, Calif.

Application March 22, 1943, Serial No. 480,055

11 Claims. (Cl. 254—93)

My invention relates to supporting structures and, more particularly, to a rotary structure such as a turntable which can be turned about a vertical axis and, if desired, adjusted in a vertical position. While the invention can be used for various purposes, it is particularly well adapted to a ground-flush installation as a part of a compass rose for testing, correcting, or calibrating one or more compasses of an airplane. It is in this connection that the invention will be particularly described.

The compasses of an airplane are usually checked both shortly after installation thereof and at frequent intervals during the life of the plane, for example, after an engine change or replacement of other equipment which may affect the compass reading. Such checking may include testing, correcting, or calibrating the one or more compasses by turning the airplane to face different compass points and making any adjustments or compiling any tables which may be necessary.

Previously accepted methods are laborious and require the use of a master compass. In employing same, a string is attached to the bottom of the fuselage and stretched forward from the airplane, being then sighted along the fuselage to hold it as close to the center line of the airplane as possible. The plane is then taxied so that this string lines up with points of the master compass usually positioned in front of the airplane, at which time observations are made. This operation must be repeated at least twenty-four times, usually at 15° intervals and requires the services of a ground crew, usually consisting of three men in addition to men in the ship, and involves on an average of one hour and fifteen minutes. On account of the many variables, as caused by wind, defective master compass, and misalignment due to the many human errors involved, this method is accurate only to approximately a 6° tolerance.

It is an object of the present invention to provide a novel turntable disposed in the center of a compass rose and adapted to support the airplane in whole or in part and to act as a pivot about which the plane can turn.

In one method of employing such a turntable, to be particularly exemplified in the present application, the airplane is taxied to the rose with the right wheel on the turntable, this wheel being centered by a suitable chock. The other wheel is positioned off the turntable and a suitable pointer is attached to its axle to be lined up with the radial lines of the compass rose as the ship pivots about the axis of the turntable under its own power. The pointer is in a position to be observed by the pilot and can be lined up accurately with the appropriate radial line of the compass rose, at which time the pilot can accurately check his compass and, if desired, another man in the rear can adjust the navigator's compass. Usually, compass corrections are first made on the north and east positions, after which checks are made on the south and west positions. Thereafter, correction tables are made for all intermediate positions at 15° intervals. By this method, the above-mentioned errors are eliminated and it is possible to hold the accuracy within any desired limit. Furthermore, two men can check and calibrate the two compasses in approximately fifteen minutes, without the aid of a ground crew.

A somewhat modified method may be employed if, as is sometimes desirable with certain types of airplanes, a compass is to be tested or calibrated with the wheels retracted (for example, toward the fuselage in close proximity to the compass) to avoid errors produced by the magnetic influence of the wheel structures. An effective way of employing the invention in this connection is to locate the airplane in proper position relative to the turntable so that the wheels straddle the turntable. A suitable lifting frame is then placed on the turntable and provides means for engaging the airplane at suitable "lift points" when the turntable is raised a few inches. Such lifting need be only sufficient to clear the wheels and permit their retraction, the plane being supported in whole or in part by the frame. If desired, the entire weight of the plane may be imposed on the turntable, though it is usually the practice to lift only that portion of the plane near the wings and allow the third wheel, properly turned to permit rotation of the plane, to support a portion of the plane. The turntable permits the airplane to be turned easily to the different compass positions for effecting the desired testing or calibration of its one or more compasses.

It is one of the important objects of the invention to provide an effective and comparatively inexpensive system for rotating and, if desired, raising planes, as required in the process of testing, correcting, or calibrating one or more compasses disposed in the airplane.

It is also an object of the present invention to provide a normally-ground-flush turntable which is appropriately formed of non-magnetic materials so as not to interfere with the correct adjustment of the compass means of an airplane.

Another object of the invention is to provide a turntable, or other rotary structure, which is substantially frictionless and in which a fluid, preferably a liquid, is entrapped to support the weight of the table means and any weight placed thereon, this support being by transmission of pressure through the fluid to a stationary member.

Still another object of the invention is to provide a structure in which a table means provides a downwardly-facing cylinder closed at its upper end and receiving an upwardly-extending post supported at its lower end, there being a chamber between the upper end of the post and the closed end of the cylinder in which a fluid is entrapped.

Another object of the invention is to position a pressure-transmitting fluid near the ground level of a table means to give a better type of support, to facilitate drainage of fluid from the chamber, and to accomplish other very advantageous results.

It is also an object of the invention to dispose the fluid-filled chamber in readily-accessible position and to provide a structure in which a packing means for such a chamber is accessible for inspection or replacement without lifting the entire table structure from this support.

A further object is to provide a novel system for limiting the vertical movement of a turntable or other structure.

Further objects and advantages of the invention will be evident to those skilled in the art from the following description of my exemplary embodiment.

Referring to the drawing.

Figure 1:
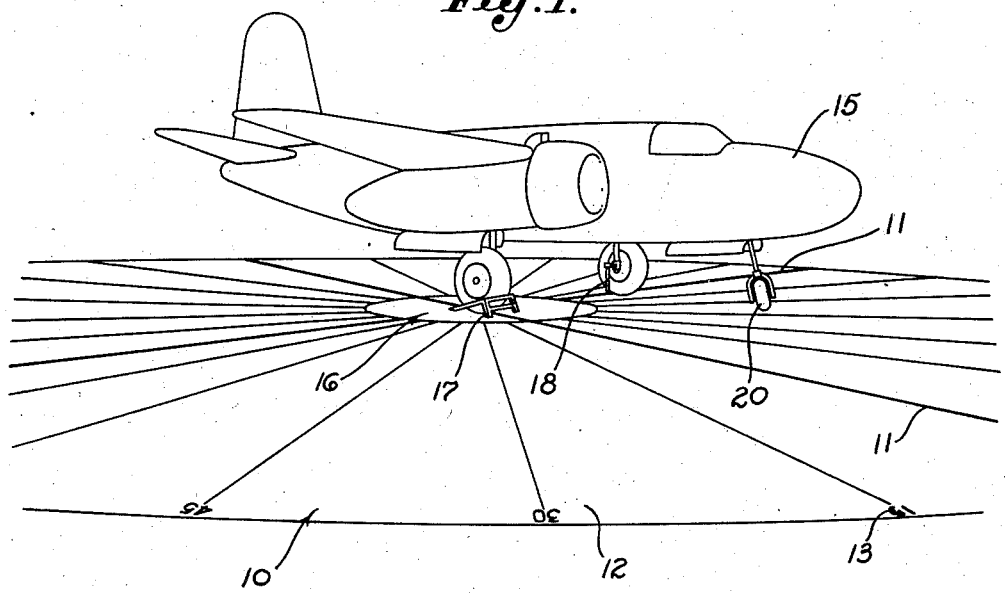
Figure 1 is a perspective view showing an airplane disposed in testing position on a compass rose embodying the invention.

Referring particularly to Figure 1, the compass rose is indicated generally by the numeral 10 and comprises a plurality of radial lines 11 laid out on a flat surface 12 of a landing field, these lines being correctly oriented with respect to true compass points. These lines are usually spaced 15° apart and are suitably marked, as indicated by the numeral 13, employing numerals visible from the pilot's compartment of an airplane 15. Disposed flush with the ground in the center of the compass rose is the turntable structure 16 of the invention.

As shown in Figure 1, the airplane is taxied to the compass rose, with its right wheel centered on the vertical axis of the turntable structure, and held in place by a suitable chock 17. A pointer 18 is detachably connected to the axle of the left wheel within view of the pilot, the diameter of the turntable structure being less than the distance between the wheels so that the pointer 18 terminates close to the ground to lie immediately above one of the lines 11 beyond the turntable. The plane 15 is shown as providing a tricycle-type landing gear, including a forward wheel 20 which is turned to facilitate rotation of the plane about the vertical axis of the turntable structure under the power of its own motors. As the plane turns, the weight on the right wheel is carried by the turntable structure 16 which pivots with the wheel to avoid harmful distortion of the wheel-supporting structure, as well as wear of the tire, and to prevent any variation in central positioning of the wheel with respect to the turntable structure. In practice, the plane is usually taxied to a position in which the pointer 18 rests above that line 11 pointing due west, at which time the airplane will be pointing due north and the pilot can make appropriate adjustments to his compass. He then swings the plane through 90° until it points due east, the compass being checked at this position and any necessary adjustments made. The ship is then progressively turned through 90° angles and similar adjustments, if necessary, are made, after which the plane is turned at 15° intervals and a suitable compass-correction table prepared.

Figure 2:
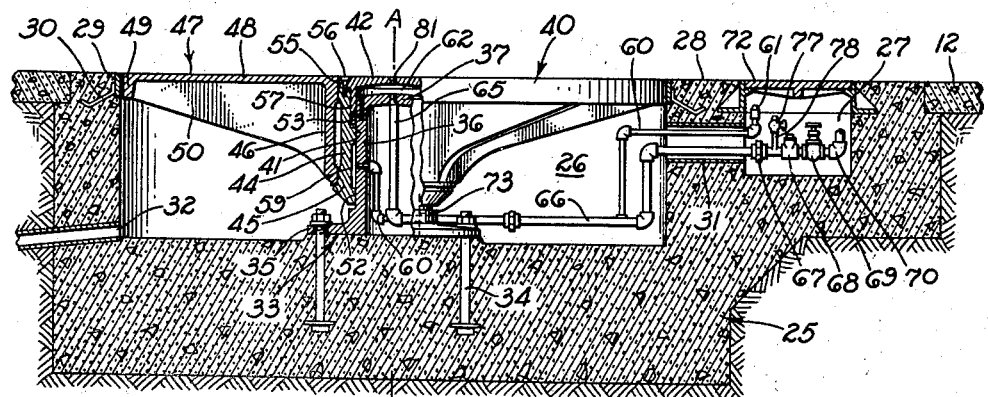
Figure 2 is a vertical sectional view, partially in elevation, of the turntable means of the invention.

The turntable structure 16 is best shown in Figure 2 as including a foundation structure 25 set in the earth and providing a turntable chamber 26 and a control chamber 27 which open at their upper ends at ground level. In this connection, the foundation means 25 provides a surface 28 flush with the surface 12. A cylindrical ring 29 of non-magnetic material, such as brass, is embedded in the foundation means 25 to form the upper boundary of the turntable chamber 26, this ring being concentric with a vertical pivot axis A—A and being retained in place by suitable non-magnetic anchors 30. Communication between the chambers 26 and 27 is provided by a pipe means 31, and drainage of the chamber 26 is accomplished by a pipe means 32, these pipe means being suitably embedded in the concrete of the foundation means.

A post means 33 is rigidly secured to bolts 34 embedded in the foundation means 25. This post means 33 provides a flange 35 through which the bolts 34 extend, and provides an upwardly-extending post 36, preferably hollow, closed at its upper end by a head 37. This post means 33 is preferably cast as a unitary member and is best formed of manganese bronze.

Rotatable with respect to the post 36 is a table means 40 providing a downwardly-facing cylinder 41 closed at its upper end by a closure means in the form of a closure plate 42, the upper surface of which is at ground level. The preferred construction of the table means 40 is best shown in Figure 2 as comprising a downwardly-extending sleeve 44 forming a press fit with respect to an inner surface 45 of a skirt 46 forming a part of a table 47. This table is usually cast integrally from manganese steel and includes a relatively thin annular top plate 48 reinforced at its periphery by an integral flange 49 of somewhat smaller diameter than the ring 29. Webs 50 are cast integrally with the skirt 46, the top plate 48, and the flange 49 to reinforce this casting.

The interior of the sleeve 44 provides a cylindrical boundary of the cylinder 41 and is of a slightly larger diameter than the smooth cylindrical periphery 52 of the post 36. This centers the table means 40 with respect to the axis A—A and effects a low-friction journalling of this table means with respect to the post 36.

The internal cylindrical surface of the sleeve 44 is counterbored to receive a packing means 53, usually of the chevron type. The invention contemplates that this packing means should be readily available from the uppermost end of the table means 40, without lifting this table means from the post 36 and without disturbing the remainder of the structure. To accomplish this, the closure plate 42 is made removable.

Figure 3:
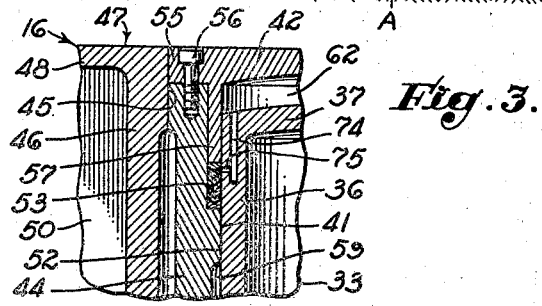
Figure 3 is an enlarged fragmentary view of a portion of Figure 1.

As best shown in Figures 2 and 3, this closure plate includes a flange 55 corresponding in external diameter to the inner surface 45 and is detachably connected to the uppermost end of the sleeve 44, as by screws 56. This closure plate 42 carries a depending annular member shown as a skirt 57 extending into the packing space occupied in part by the packing means 53. The skirt 57 is of suitable length to compress the packing means 53 to a desired extent so as to form a substantially fluid-tight junction between the post 36 and the sleeve 44. The internal journalling surface of the sleeve 44 is preferably relieved to form a chamber 59 around the post 36 below the packing means 53. Any fluid leaking past the packing means and entering this chamber 59 serves to lubricate the structure. However, as such leakage is usually small, I prefer to provide an auxiliary supply of lubricant to this chamber to insure adequate lubrication of the journalling surfaces. A small pipe 60 serves in this connection and is shown as substantially paralleling a pipe means 66, to be later described, to terminate in a suitable grease-gun fitting 61 in the chamber 27 through which grease may be forced into the chamber 59.

The uppermost end of the post 36, determined by the head 37, terminates below ground level. When the table means 40 is at ground level, as shown in Figure 2, the head 37 and the closure plate 42 are spaced from each other to define a chamber 62 serving to entrap a fluid, preferably a liquid, so that the table means 40 and any weight placed thereon is supported by transmission of pressure through the fluid to the uppermost end of the post 36. This provides for a substantially frictionless journalling of the table means, the fluid in the chamber 62 being compressed in proportion to the weight supported and serving to separate the table means 40 from the post 36 except for the cylindrical journalling surfaces which prevent tipping of the table means as the wheel of the airplane is rolled thereon. However, when the wheel of the airplane is centrally disposed, there is substantially no tendency to tip the table means and, correspondingly, there is substantially no friction at the cylindrical journalling surfaces.

The fluid in the chamber 62 is preferably a liquid and means is provided for varying the amount of this liquid and for entrapment of this liquid. This means is shown as including a pipe 65 extending upward in the post 36 and connected at its lower end to form a part of the pipe means 66 extending through an opening of the post means 33 and through the embedded pipe 31 into the control chamber 27. Here, this pipe means is usually provided with a union 67 and a check valve 68 of the type preventing rightward flow. A manual valve 69 is also provided, as is also a fitting 70 adapted for connection to a pump, or other source of pressure, not shown, for forcing the liquid into the chamber 62. A permanently connected, variable-pressure source of liquid can be employed, particularly where it is desired to lift the turntable frequently, in which event the check valve 68 and appropriate fluid-release means for lowering the turntable can be positioned at a remote point. Where no frequent lifting is required, I prefer to use a portable pump detachably connected to the fitting 70 upon removal of a plate 72 closing the control chamber 27. In this way, the portable pump can be connected when the installation is first made and a suitable quantity of liquid forced through the pipe means 66 to the chamber 62. As the liquid is forced into the chamber 62, the table means 40 rises and the liquid is trapped in the system by the check valve 68, or, if this check valve is not used, it is entrapped by closing the manual valve 69.

Before liquid is delivered to the chamber 62 to raise the table means 40 to ground level, this table means is in a lower position, determined by a stop means comprising a shoulder 73 on the post means 33 which contacts and supports the lowermost end of the sleeve 44. As soon as a relatively small amount of liquid is forced into the chamber 62, the table means 40 rises to disengage this stop means and support the table means hydraulically.

Preferably, a stop means is also provided for limiting the maximum upper movement of the table means 40. In this connection, I prefer to provide a limit means permitting fluid to escape from the chamber 62 when the table means reaches a desired uppermost position. To accomplish this, intersecting bores 74 and 75 are formed in the post means 33, the former extending through the head 37 to communicate with the chamber 62 and the latter extending through the post 36 to communicate, when the table means 40 is at ground level, with the packing chamber containing the packing 53. When the table means is thus positioned, the packing means 53 prevents escape of fluid from the chamber 62 through the bores 74 and 75. However, when the table means rises to bring the lowermost portion of the packing means adjacent the bore 75, this uncovers the bore and permits escape of fluid downward between the wall of the cylinder 41 and the cylindrical surface 52 of the post 36, this fluid entering the chamber 59 and subsequently escaping therefrom to pass through the drain 32. The area of the fluid-escape passage may be properly correlated with the rate of fluid supply to the chamber to discharge all of the fluid delivered to the chamber 62 when the table means is in its desired uppermost position, even though the fluid supply is continued at its normal rate.

Very little, if any, attention need be given to the device even after prolonged operation. If the table means 40 lowers slightly from its ground-level position, it is necessary only to force a small additional amount of liquid into the chamber 62. However, it is desirable to inspect periodically the packing 53. This can be accomplished by draining the chamber 62, either through removal of a plug 81 in the closure plate 42 or, preferably, by opening a small petcock 77 in a pressure-relief pipe 78 communicating with the pipe means 66 between the union 67 and the check valve 68. This permits the entrapped liquid to flow under pressure or by gravity through the pipe means 66 and discharge through the petcock 77 communicating with the pressure side of the check valve 68. It will be apparent also that the plug 81 or the pipe 78 can be used for introducing fluid into the chamber 62, if desired.

To inspect the packing 53, it is necessary only to remove the closure plate 42, which makes the packing immediately accessible for inspection or replacement. This is in contradistinction to any system in which the chamber 62 is disposed at the lower end of a piston depending from the table means. In that instance, the chamber must be at the lower end of the turntable chamber 26 and the entire table means must usually be lifted to inspect or adjust the packing.

It is preferable to form all of the elements of the invention of non-magnetic material. In addition, it is desirable that the post 36 (preferably formed of manganese bronze, as mentioned above) and the sleeve 44 be of different materials to give a better journalling action. In practice, I prefer to form the sleeve 44 of non-magnetic iron. The table 47 is preferably cast from a material such as manganese or nickel steel, and the piping can be formed of copper, brass, or other non-magnetic material.

It will be apparent that the invention is not limited to a turntable for use in conjunction with a compass rose. It finds distinct utility in numerous industrial, railroad, and commercial uses such, for example, as for transferring materials from one piece of equipment to another at different elevations, as for transferring vehicles from one track to another, etc. Nor is the invention necessarily limited to a turntable as it is well adapted to lifting, as well as turning, and the construction can be employed for hydraulic hoists or other lifting devices, irrespective of the ability of the table means 40 to turn about the axis A—A. The device is also well adapted to hydraulic hoists for lifting automobiles or other mechanical equipment for inspection and servicing.

Various changes can be made in the device without departing from the spirit of the invention as defined in the appended claims.

I claim as my invention:

1. In a rotary structure, the combination of: an upwardly-extending post supported at its lower end and providing a cylindrical external surface; a table means including a downwardly-extending skirt and a sleeve fitting tightly therein, said sleeve providing a cylinder and being journalled on said post, said table means providing a closure means closing the upper end of said cylinder above the top of said post and flush with the surface of said table means to provide a closed chamber between said closure means and the top of said post; stop means operatively associated with said post and said table means for limiting the lowermost position of said table means with respect to said post; and means for forcing liquid into said chamber and entrapping a body of liquid therein to raise said table means from its lowermost position to support said table and any weight placed thereon by transmission of pressure through the entrapped liquid to the upper end of said post.

2. In a rotary structure, the combination of: a large circular table disposed in a circular pit sunk in the ground and providing a flat horizontal surface substantially aligned with the surrounding ground surface and having a central opening therein; a sleeve structure depending from said table concentric with said central opening and comprising a sleeve and a closure plate closing the upper end of said sleeve, said closure plate being of a size to close said central opening and providing an upper surface flush with said surface of said table, said sleeve structure providing a cylinder; a stationary post extending upward in said sleeve structure and terminating short of said closure plate to provide a chamber; and means for supplying liquid to said chamber and for entrapping same therein to support the weight of said table and said sleeve structure by transmission of pressure through said liquid to the upper end of said post, said means comprising a conduit providing one end opening on said chamber, the other end of said conduit being outside said pit and at a level below said chamber, said means including means for supplying liquid to said conduit under pressure and for draining liquid from said other end of said conduit.

3. In a rotary structure, the combination of: an upwardly-extending post supported at its lower end and providing a cylindrical external surface; a table means providing a downwardly-extending sleeve providing a cylinder, said sleeve being journalled on said upwardly-extending post; a packing means for sealing said sleeve and said post in fluid-tight relationship; a removable closure means extending across said sleeve to close the upper end of said cylinder and provide a chamber in said sleeve between said closure means and the upper end of said post, said closure means including a depending annular member engaging said packing means whereby removal of said closure means gives access to said packing means from the upper end of said sleeve; and means for entrapping a body of liquid in said chamber to support said table means and any weight placed thereon by transmission of pressure through the entrapped liquid to the upper end of said post.

4. In a rotary structure, the combination of: an upwardly-extending post supported at its lower end and providing a cylindrical external surface; a table means providing a downwardly-extending sleeve providing a cylinder of a diameter only slightly larger than said cylindrical external surface of said post whereby said table means is journalled to turn about said post, the upper portion of said sleeve providing a larger-diameter portion spaced from said cylindrical external surface of said post to provide a packing space; packing means in said packing space for sealing said sleeve with respect to said post; means for compressing said packing in said packing space; a removable closure plate extending across said sleeve to close the upper end of said cylinder and provide a chamber in said sleeve between said closure plate and the upper end of said post; and a body of liquid entrapped in said chamber to support said table means and any weight placed thereon by transmission of pressure through the entrapped liquid to the upper end of said post.

5. A combination as defined in claim 4, in which said means for compressing said packing comprises a skirt depending from said removable closure plate and extending into said packing space whereby removal of said closure plate gives access to said packing.

6. In combination in a rotary, vertically-adjustable supporting structure: an upwardly-extending post supported at its lower end; a table means providing a downwardly-facing cylinder closed at its upper end, said post extending upwardly in said cylinder to journal said table means both for rotational and vertical movement, there being a chamber in the upper closed end of said cylinder above the upper end of said post; a packing means associated with said table means to move up and down therewith in engagement with said post to aid in preventing escape of liquid from said chamber; and means for delivering a liquid to said chamber to lift said table means and support same and any weight placed thereon by transmission of pressure through said liquid to the upper end of said post, said post providing passage means communicating between said chamber and said packing means when said table means is below an uppermost position, said packing means moving upwardly with said table means to uncover said passage means and permit escape of liquid from said chamber when said table means is at said uppermost position.

7. In a ground-flush turntable for installation in a circular pit below ground level, the combination of: a post means extending centrally upwardly in said pit to a position a short distance below ground level; a circular table means of a size to turn in said circular pit and providing a flat horizontal surface adapted to be lifted to a position flush with the ground, said circular table means providing a downwardly-facing cylinder slidably receiving said post means and opening on the top of said table means; a removable closure plate for closing said opening, said closure plate providing an upper surface substantially flush with said flat horizontal surface and providing a lower surface bounding the uppermost portion of said cylinder, said cylinder cooperating with said post means in defining a variable-volume chamber just below ground level and removably closed at its upper end by said closure plate; and means for delivering fluid under pressure to said closed chamber to lift said table means until said surface thereof is substantially flush with the ground and to support said table means and any weight placed thereon by transmission of pressure through said fluid to the upper end of said post means.

8. In a ground-flush turntable for installation in a circular pit below ground level, the combination of: a post means extending centrally upwardly in said pit to a position a short distance below ground level; a circular table means of a size to turn in said circular pit and providing a horizontal surface adapted to be lifted to a position flush with the ground, said circular table means providing a downwardly-facing cylinder slidably receiving said post means, said cylinder cooperating with said post means in defining a variable-volume closed chamber just below ground level; means for delivering fluid under pressure to said closed chamber to lift said table means until said surface thereof is substantially flush with the ground and to support said table means and any weight placed thereon by transmission of pressure through said fluid to the upper end of said post means; and a packing means for sealing said post means and said cylinder to entrap fluid in said closed chamber, said packing means being positioned near the upper end of said post means, said table means including a removable closure means bounding the upper end of said closed chamber and removable to give access to said packing means from the top of said table means.

9. A combination as defined in claim 1, including means for limiting the upward movement of said table means, this means including means for discharging from said chamber the liquid supplied thereto when said table means reaches a desired uppermost position.

10. A combination as defined in claim 1, including a packing means associated with said sleeve at a position near the upper end of said post, and including passage means communicating between said packing means and said closed chamber to transmit the pressure of said liquid to said packing means.

11. A combination as defined in claim 1, including a packing means near the upper end of said post for sealing said post with respect to said sleeve, and in which said sleeve provides a chamber below said packing means to receive any liquid escaping from said closed chamber past said packing means.

OSCAR W. ANDERSEN.